United States Patent [19]

Linger

[11] Patent Number: 4,573,703
[45] Date of Patent: Mar. 4, 1986

[54] VEHICLE SUSPENSIONS

[76] Inventor: Virgil S. Linger, 3555 Bradley Brownlee Rd., Cortland, Ohio 44410

[21] Appl. No.: 571,104

[22] Filed: Jan. 16, 1984

[51] Int. Cl.⁴ .............................................. B60G 3/00
[52] U.S. Cl. .................................. 280/701; 267/20 R
[58] Field of Search ............... 280/662, 668, 692, 697, 280/715; 267/11 R, 12, 20

[56] References Cited

U.S. PATENT DOCUMENTS

| | | | |
|---|---|---|---|
| 2,005,513 | 6/1935 | Weaver | 267/20 |
| 2,093,822 | 9/1937 | Stump | 280/692 |
| 2,658,748 | 11/1953 | Premoli | 267/20 R |
| 2,744,749 | 5/1956 | Fiedor | 267/20 |
| 2,744,761 | 5/1956 | Steele | 280/47.22 |
| 2,845,134 | 7/1958 | Reimspiess | 180/73 |
| 2,886,312 | 5/1959 | Freiermuth | 280/692 |
| 3,638,963 | 2/1972 | Van Leeuen | 280/194 |

FOREIGN PATENT DOCUMENTS 757064  3/1953  Fed. Rep. of Germany ...... 280/697

Primary Examiner—Joseph F. Peters, Jr.
Assistant Examiner—Ross Weaver
Attorney, Agent, or Firm—Michael Williams; Warren N. Low

[57] ABSTRACT

A suspension for a vehicle that improves riding comfort without sacrificing stability. The improved suspension may be disposed at front wheels, or rear wheels, or both front and rear wheels. Each suspension at the front or rear wheels comprises a walking beam pivoted intermediate to its ends and arranged longitudinally of the vehicle. One end of the walking beam is disposed over the axle which supports the wheel, with a first spring disposed between the beam end and a mounting bracket connected to the wheel hub, while the other end of the walking beam is disposed over a support which is rigidly carried by the vehicle frame, with a second spring disposed between this beam other end and the rigid support. Thus, when the wheel strikes a bump in the road, it and its axle are displaced upwardly and compress the first spring to absorb part of the road shock. However, because the walking beam is pivoted intermediate to its ends, road shock will be transmitted to the second spring to compress the same. Since road shock is absorbed by the two springs, the vehicle ride is substantially improved. My invention is adapted to be used with a MacPherson strut-type suspension and makes use of the coil spring in such strut to provide the first spring noted above.

6 Claims, 4 Drawing Figures

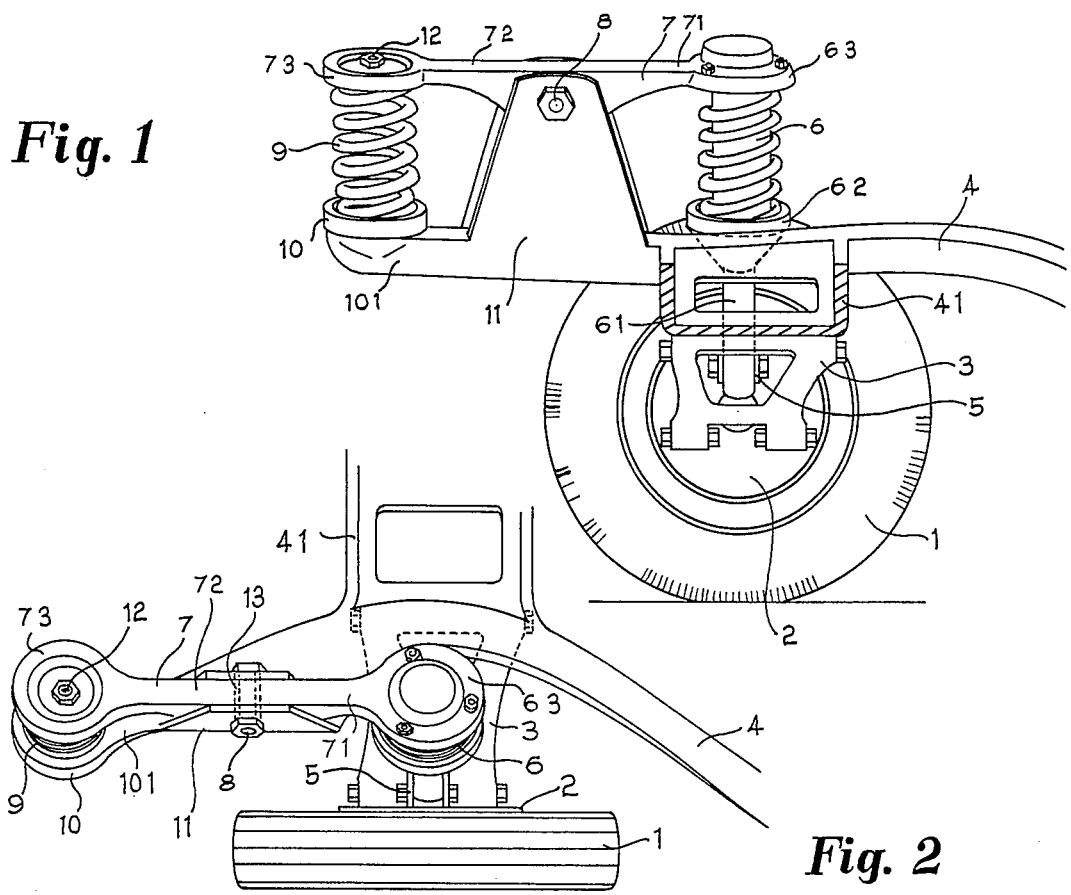
*Fig. 1*
*Fig. 2*
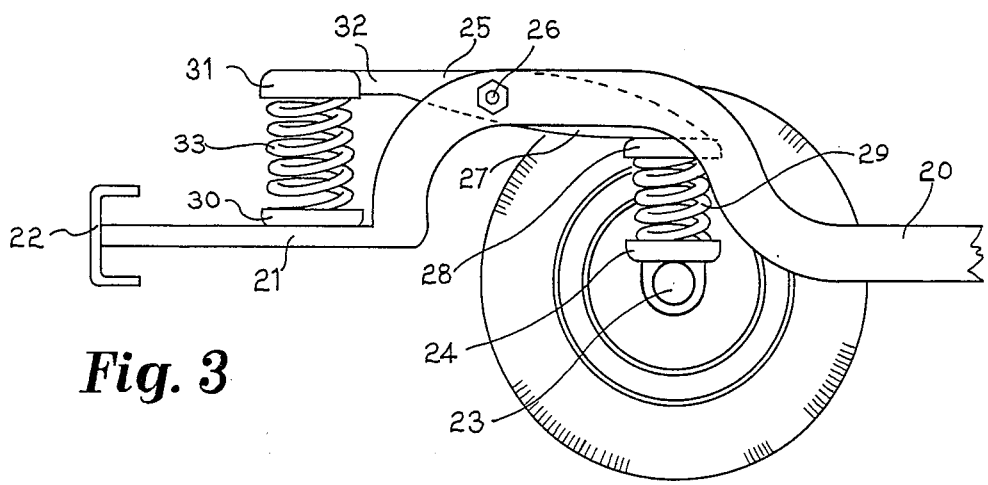
*Fig. 3*
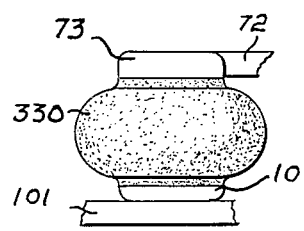
*Fig. 4*

VEHICLE SUSPENSIONS

BACKGROUND AND SUMMARY

Vehicle suspensions of the prior art have taken many forms and include leaf springs, coil springs and air bags. An early patent, U.S. Pat. No. 2,005,513, issued June 18, 1935, to H. C. Weaver discloses a pair of levers which extend crosswise of the vehicle frame and have adjoining ends pivoted to each other. Because of the crosswise disposition of the levers and the disposition of a coil spring above the pivot between the levers, the ride is not cushioned as effectively as it is in my improved suspension.

Another patent in the prior art is U.S. Pat. No. 2,744,749 issued May 8, 1956, to L. F. Fiedor. This patent discloses a suspension wherein an arm has one end pivotally connected to the frame of the vehicle, and two coil springs working on the free end of the arm, one between the arm and the frame and the other between the arm and the wheel axle. This construction requires a weight on the free end portion of the arm. It is submitted that the road shock is not as effectively distributed in the Fiedor construction, because no walking-beam equalizing feature is present.

My improved suspension comprises a walking beam pivoted intermediate to its ends to the frame of the vehicle to extend longitudinally of the frame. One end of the beam overlies the wheel hub and a coil spring is interposed between this beam and the wheel hub. The other end of the beam overlies a support which may be a part of the vehicle frame, or an extension rigidly connected thereto, and a second spring is interposed therebetween. This second spring may take the form of a coil spring or an air bag. In vehicles that have MacPherson strut-type suspensions, the coil spring of such strut may be used as one of the springs required in my improved suspension.

DESCRIPTION OF THE DRAWING

In the drawing accompanying this specification and forming a part of this application, there are shown embodiments which my invention may assume, and in this drawing:

FIG. 1 is a fragmentary view of a vehicle frame, the view being in the form of a section through a beam extending crosswise of the vehicle at an end of the frame to tie together the pair of longitudinal members of the frame, the view showing a MacPherson strut that is, as usual, at a slight angle to the vertical for improved road handling.

FIG. 2 is a fragmentary top plan view of the structure shown in FIG. 1 and

FIG. 3 is a view of another embodiment, and

FIG. 4 is a fragmentary view of an airbag utilized in lieu of a coil spring in the invention.

DESCRIPTION OF THE PREFERRED EMBODIMENT

The suspension shown in the drawing may be at both front wheels of a vehicle, both rear wheels, or at all four wheels since automobiles now have independent suspensions at all four wheels. In the parts as shown in the drawing, the wheel 1 is one of the front wheels. The vehicle comprises a frame or reinforced metal fabrication and includes longitudinally-extending beams 4 rigidly tied together by a cross beam 41.

A short arm or "A" frame 3 connects the wheel and hub to the cross beam 41, and a mounting bracket 5 is provided for the lower end of a suspension unit which, in the embodiment illustrated in FIGS. 1 and 2, is in the form of a MacPherson strut. All of the foregoing is common in modern-day suspensions and is described for a basis of disclosure of my invention.

The usual MacPherson strut comprises a shock absorber 6 having its piston rod 61 connected to the mounting bracket 5. A lower spring platform 62 is rigidly connected to the piston rod of the shock absorber and normally an upper spring platform 63 is rigidly connected to the upper end of the cylinder with a heavy coil spring interposed between the lower and upper platforms. In the usual MacPherson strut suspension the upper spring platform is bolted to a part of the vehicle which is rigid with the frame. The MacPherson strut may be inverted from the position shown in FIG. 1 with the piston rod uppermost and carrying the upper spring platform.

In accordance with my invention the upper spring platform 63, instead of being bolted to the vehicle, is bolted to one arm 71 of a walking beam 7. The beam is disposed between a pair of upstanding steel plates 11 which may be integral with the respective beam 4 as shown in FIG. 1, but preferably comprise a separate fabrication which is bolted or welded to the beam. The walking beam is pivoted to the plates, intermediate to its ends 71 and 72, by bolt and nut connection, with a bushing 13 surrounding the shank of the bolt for bearing purposes.

The respective beam 4 of the vehicle frame may have an integral projection 101 beyond the plates 11, or this projection may be rigidly attached to the beam. An upwardly-facing spring platform 10 is rigidly secured to the projection 101 and a heavy coil spring 9 is interposed between the platform 10 and a downwardly-facing platform 73 rigidly secured to the arm 72 of the walking beam 7. Instead of the spring 9, a conventional air bag as illustratively shown at 330 in FIG. 4. may be interposed between the platform 10 and 73. The top of the coil spring 9 or air bag is secured to the spring platform 73 by a nut and bolt connection 12 so that when pressure on the MacPherson strut is released, the connection of the coil spring or air bag with the walking beam arm 72 remains intact.

It is preferred that the arms 71 and 72 be of equal length and the springs 6 and 9 of equal force, although my invention is operable with arms of different length and springs of different force. In operation, when the wheel 1 strikes a bump in the road, it is forced upwardly to compress the spring 6 and this causes a reaction on the walking beam 7 to force the arm 71 upwardly and the arm 72 downwardly to also compress the spring 9. Thus, the road shock is absorbed by a pair of springs on opposite arms of a lever and thereby provides a smoother ride.

My invention may be applied to suspensions that do not include a MacPherson strut, and this is shown in the embodiment of FIG. 3. The vehicle frame, as before, may be formed of a pair of laterally-spaced, longitudinally-extending beams 20 (only one shown) which terminate in forward extensions 21 to which a bumper 22 may be connected. The wheel axle 23 is held by usual structure (not shown) and has an upwardly-extending spring platform 24. A walking beam 25 is pivoted intermediate to its ends to the frame beam 20, as by a nut and bolt connection 26 similar to that previously described.

The arm 27 of the walking beam has a downwardly-facing spring platform 28 and a coil spring 29 is held in position interposed between platforms 24 and 28. The extension 21 has an upwardly-facing spring platform 30 cooperating with a downwardly-facing spring platform 31 on the arm 32 of the walking beam, and a coil spring 33 (or air bag) is held in position interposed between platforms 30 and 31. A usual shock absorber (not shown) will be positioned as is customary to dampen spring action.

I claim:

1. A vehicle having a frame and a generally vertically-disposed MacPherson strut suspension carried by the frame and connected to a vehicle wheel, said MacPherson strut comprising a shock absorber including relatively movable parts in the form of a cylinder and a piston within said cylinder, said piston having a rod connected to it and extending outwardly of said cylinder, and said MacPherson strut also including a coil spring surrounding a portion of said shock absorber, a walking beam disposed longitudinally of said frame and pivoted intermediate to its ends on said frame, one of said relatively movable parts of said shock absorber being movable vertically with the wheel axle and the other of said movable parts being connected to one arm of said walking beam, said shock absorber having a spring platform connected to it and facing upwardly and said one arm having a spring platform connected to it and facing downwardly, said coil spring being compressed between said spring platforms, and the other arm of said walking beam having a spring platform facing downwardly, and a cushioning device compressed between this spring platform and a portion of said vehicle frame.

2. The construction according to claim 1 wherein said cushioning device is in the form of an air bag.

3. The construction according to claim 1 wherein said cushioning device is in the form of a coil spring.

4. The construction according to claim 1 wherein said walking beam arms are of equal length.

5. The construction according to claim 1 wherein said frame comprises spaced flat surfaces between which a flat portion of said walking beam is closely but slidably confined for lateral stability, the pivot for said walking beam extending transversely through spaced flat surfaces and said walking beam.

6. The construction according to claim 5 wherein said spaced flat surfaces are formed by a pair of metal plates which are structurally integral with said frame.

* * * * *